(12) United States Patent
Adams et al.

(10) Patent No.: US 8,447,696 B2
(45) Date of Patent: *May 21, 2013

(54) SYSTEM AND METHOD FOR HANDLING PERIPHERAL CONNECTIONS TO MOBILE DEVICES

(75) Inventors: Neil P. Adams, Waterloo (CA); Herbert A. Little, Waterloo (CA); Christopher E. S. Pattenden, Waterloo (CA); Michael K. Brown, Waterloo (CA); Michael G. Kirkup, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 787 days.

This patent is subject to a terminal disclaimer.

(21) Appl. No.: 12/576,737

(22) Filed: Oct. 9, 2009

(65) Prior Publication Data

US 2010/0031371 A1    Feb. 4, 2010

Related U.S. Application Data

(63) Continuation of application No. 11/067,239, filed on Feb. 25, 2005, now Pat. No. 7,664,707.

(60) Provisional application No. 60/566,774, filed on Apr. 30, 2004.

(51) Int. Cl.
*G06F 21/00* (2006.01)
*G06F 7/04* (2006.01)

(52) U.S. Cl.
USPC ............... 705/51; 705/55; 726/27; 726/29

(58) Field of Classification Search
USPC ............... 705/51, 55; 713/183, 185; 726/27, 726/28, 29; 709/228
See application file for complete search history.

(56) References Cited

U.S. PATENT DOCUMENTS

| | | | |
|---|---|---|---|
| 7,296,149 B2 | 11/2007 | Hiltgen | |
| 7,333,946 B1 | 2/2008 | Sipponen | |
| 7,337,229 B2 | 2/2008 | Dutta et al. | |
| 7,406,323 B2 | 7/2008 | Ayatsuka et al. | |
| 7,528,867 B2 | 5/2009 | Ishiyama et al. | |
| 7,664,707 B2* | 2/2010 | Adams et al. | 705/51 |

(Continued)

FOREIGN PATENT DOCUMENTS

| | | | |
|---|---|---|---|
| EP | 1239630 A2 | | 9/2002 |
| GB | 2370383 A | | 6/2002 |
| JP | 2009239920 A | * | 10/2009 |
| WO | 0072506 A1 | | 11/2000 |
| WO | 0188677 A2 | | 11/2001 |

OTHER PUBLICATIONS

Microsoft Press Computer Dictionary, Third Edition, Microsoft Press, Redmond, 1997, p. 27.*

(Continued)

*Primary Examiner* — Nicholas D Rosen
(74) *Attorney, Agent, or Firm* — Conley Rose, P.C.; J. Robert Brown, Jr.

(57) ABSTRACT

Systems and methods for establishing a data connection between a mobile device and a peripheral. The mobile device is configured to determine whether to handle user approval of the data connection between the mobile device and the peripheral. Through the mobile device, an input mechanism is provided for the user to provide input. The input is used in determining whether to approve the data connection between the mobile device and the peripheral.

19 Claims, 8 Drawing Sheets

U.S. PATENT DOCUMENTS

| | | | |
|---|---|---|---|
| 2002/0062385 | A1 | 5/2002 | Dowling |
| 2003/0095521 | A1 | 5/2003 | Haller et al. |
| 2003/0150756 | A1 | 8/2003 | Kajiya |
| 2004/0061792 | A1 | 4/2004 | Ota et al. |
| 2004/0092231 | A1 | 5/2004 | Ayatsuka et al. |
| 2004/0133525 | A1 | 7/2004 | Singh et al. |
| 2004/0162027 | A1 | 8/2004 | Chang |
| 2004/0249994 | A1 | 12/2004 | Shapiro et al. |
| 2004/0259539 | A1 | 12/2004 | Ayatsuka |
| 2005/0044479 | A1 | 2/2005 | Willams et al. |
| 2007/0226805 | A1 | 9/2007 | Jeal et al. |

OTHER PUBLICATIONS

European Examination Report; EP Patent Application No. 05714533.6; Jun. 24, 2010; 4 pgs.

Third European Examination Report; Application No. 05714533.6; Jun. 28, 2011; 4 pages.

Canadian Office Action; Canadian Patent Application No. 2,564,865; Aug. 6, 2010; 3 pgs.

Supplementary European Search Report; EP Patent Application No. 05714533.6; Jul. 6, 2007; 3 pgs.

PCT Written Opinion of the International Searching Authority and PCT International Search Report; PCT Application No. PCT/CA2005/000291; May 31, 2005; 8 pgs.

Bluetooth PC Technology Guide; www.pctechguide.com/30mobcomms_Bluetooth.htm; Nov. 1, 2002; 3 pgs.

Canadian Office Action; Application No. 2,564,865; Aug. 30, 2011; 3 pages.

* cited by examiner

US 8,447,696 B2

SYSTEM AND METHOD FOR HANDLING PERIPHERAL CONNECTIONS TO MOBILE DEVICES

CROSS-REFERENCE TO RELATED APPLICATIONS

The present application is a continuation of and claims priority to U.S. patent application Ser. No. 11/067,239, filed Feb. 25, 2005, by Neil P. Adams et al, entitled "System and Method for Handling Peripheral Connections to Mobile Devices", which claims priority from U.S. Provisional Application No. 60/566,774, filed Apr. 30, 2004, by Neil P. Adams et al., entitled "System and Method for Handling Peripheral Connections to Mobile Devices" all of which are incorporated by reference herein as if reproduced in their entirety.

BACKGROUND

The present invention relates generally to the field of communications, and in particular to data connections to mobile wireless communications devices.

Mobile wireless communications devices typically allow peripherals (e.g., a desktop computer) to connect to the devices. When a peripheral is installed, a connection between a mobile device and a peripheral can be opened, and data is then allowed to be transferred between the two.

Because of security reasons and other reasons, typically the connection is to be approved by the device's user before data can be transferred. As an illustration, if the connection is not approved, an attacker could mount the following attack. If the user has a Trojan horse application on their handheld, then an attacker can pickpocket the device, attach a laptop, connect with the Trojan horse application, and then the application can transfer the user's data from the device or inject a rogue application. Accordingly, some type of approval should be used when dealing with peripherals for mobile devices.

In accordance with the teachings disclosed herein, systems and methods are provided for establishing a data connection between a mobile device and a peripheral. As an example of a system and method, the mobile device is configured to determine whether it is to handle user approval of the data connection between the mobile device and the peripheral. Through the mobile device, an input mechanism is provided for the user to provide input. The input is used in determining whether to approve the data connection between the mobile device and the peripheral.

As another example, an apparatus can include connection handler data processing instructions configured to determine, on the mobile device, that the mobile device is to handle user approval of the data connection between the mobile device and the peripheral. Output instructions can be configured to provide through the mobile device a prompt to the user for the user to provide input. The connection handler instructions can be configured to determine whether to approve the data connection between the mobile device and the peripheral based upon the user input.

As will be appreciated, the systems and methods disclosed herein are capable of other and different embodiments, and capable of modifications in various respects. Accordingly, the drawings and description set forth herein are to be regarded as illustrative in nature and not restrictive.

DETAILED DESCRIPTION OF THE DRAWINGS

Figure 1:
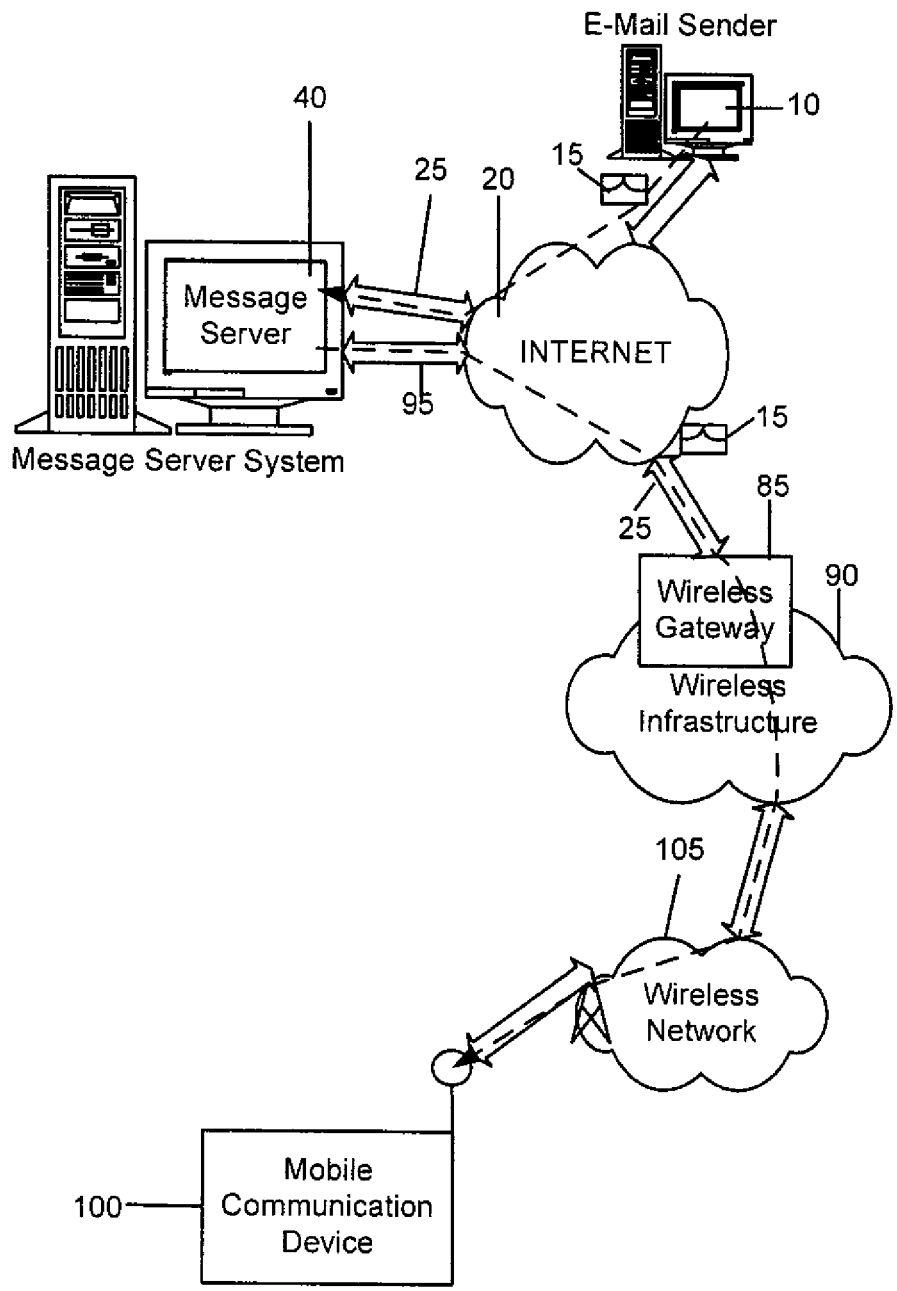
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
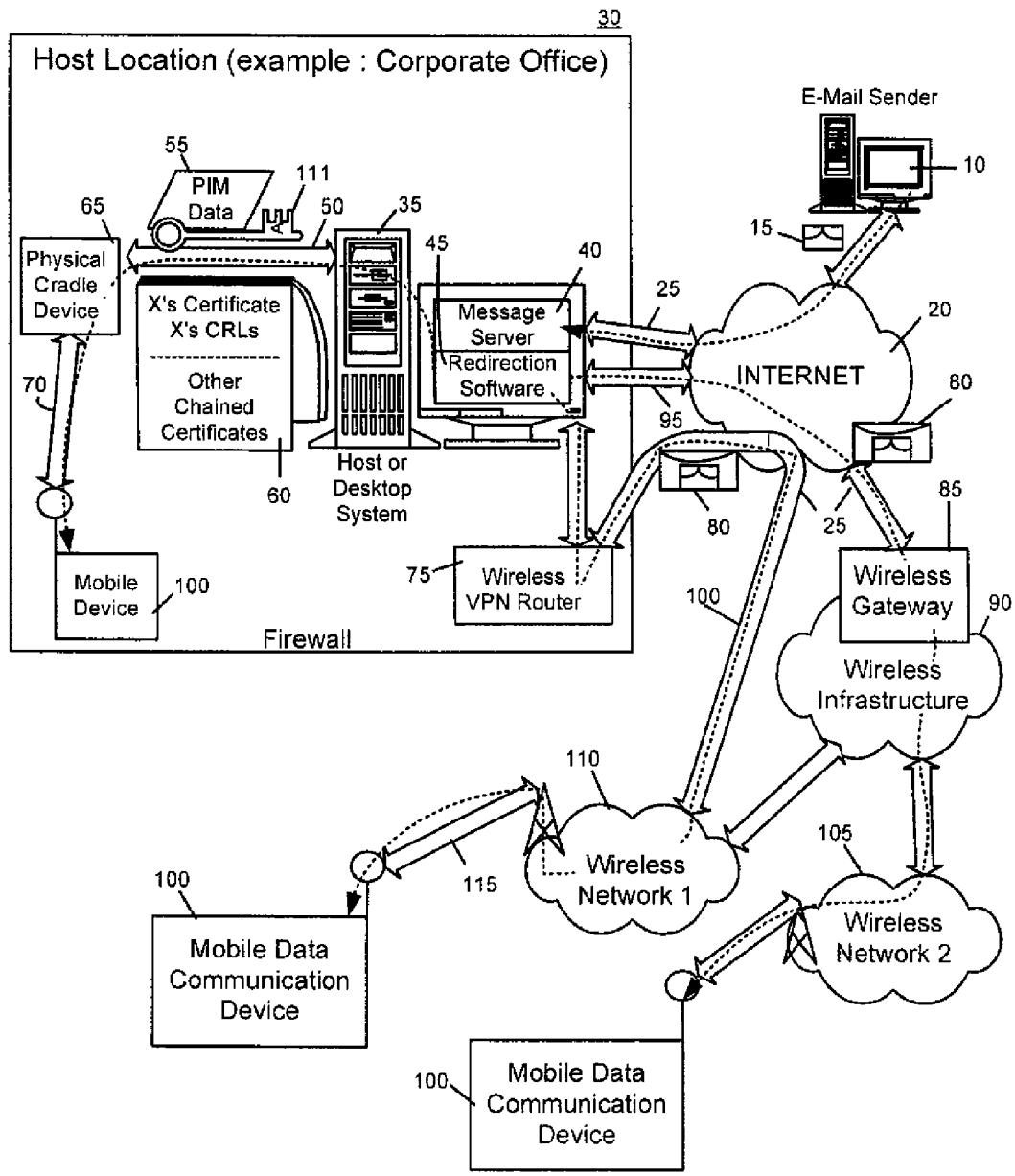
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
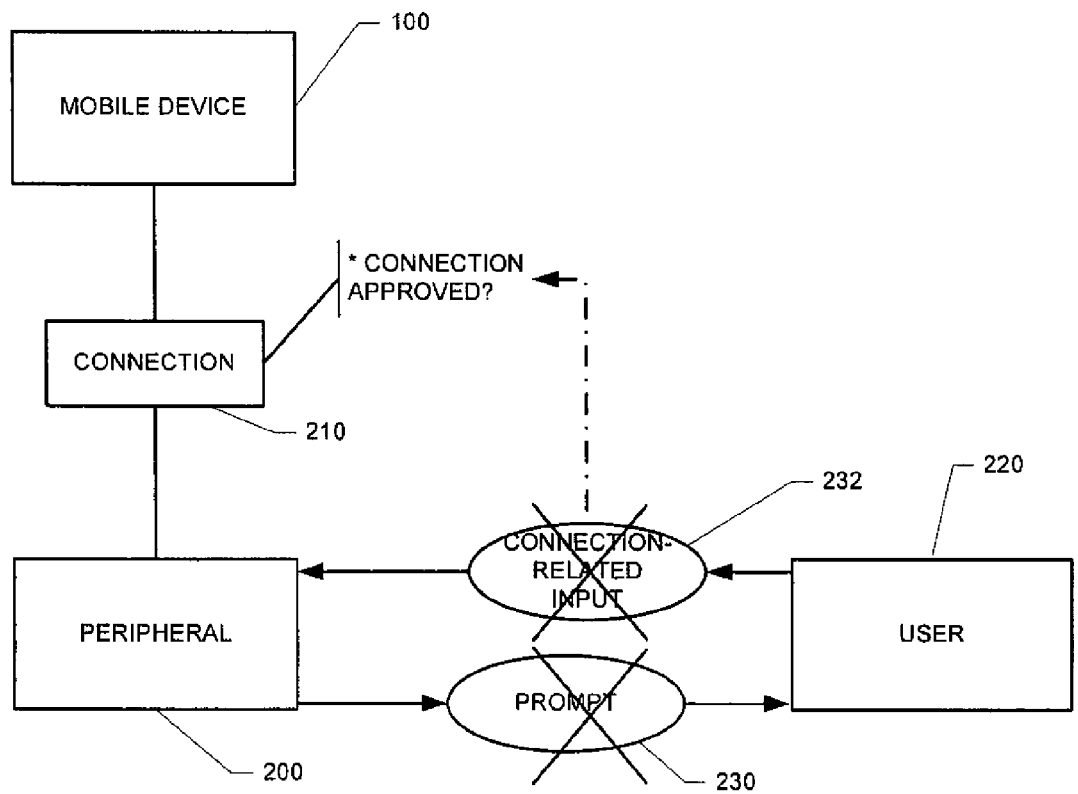
FIGS. 3 and 4 are block diagrams depicting attempts to establish a data connection between a mobile device and a peripheral.

FIG. 3 depicts a mobile device 100 and a peripheral device 200 attempting to establish a connection 210 between themselves. The connection 210 is intended to allow data to be transferred between the devices (100, 200). Some examples of peripherals 200 are:

a personal computer (e.g., a desktop or laptop computer) in order to do, among other things, backup/restore or synchronization operations.

a smart card reader in order to do two factor authentication and security operations.

a memory card.

a hardware crypto token.

a camera.

etc.

The connection 210 can involve a physical connection or a wireless connection with a peripheral. As an example, a connection 210 can be a USB (universal serial bus) connection, wherein a USB cable is attached to the USB ports of each device. Data transfer between the devices can occur after the USB connection is approved by a user (e.g., a mobile device can store and/or retrieve data stored on a peripheral memory card).

Before a connection 210 can be opened, a user 220 is to approve the connection 210, such as by typing their handheld password 232 via the peripheral's computer-human interface (e.g., desktop computer's keyboard and display screen). Once the password 232 is verified with the mobile device 1001 the connection 210 is opened and data can be transferred. This mechanism for authenticating the desktop to the device (i.e., the handheld owner is the one using the desktop) works because the desktop has an output device (e.g., a screen) to prompt the user 220 to enter their password and an input device (e.g., a keyboard) to allow the user 220 to enter their password.

Figure 4:
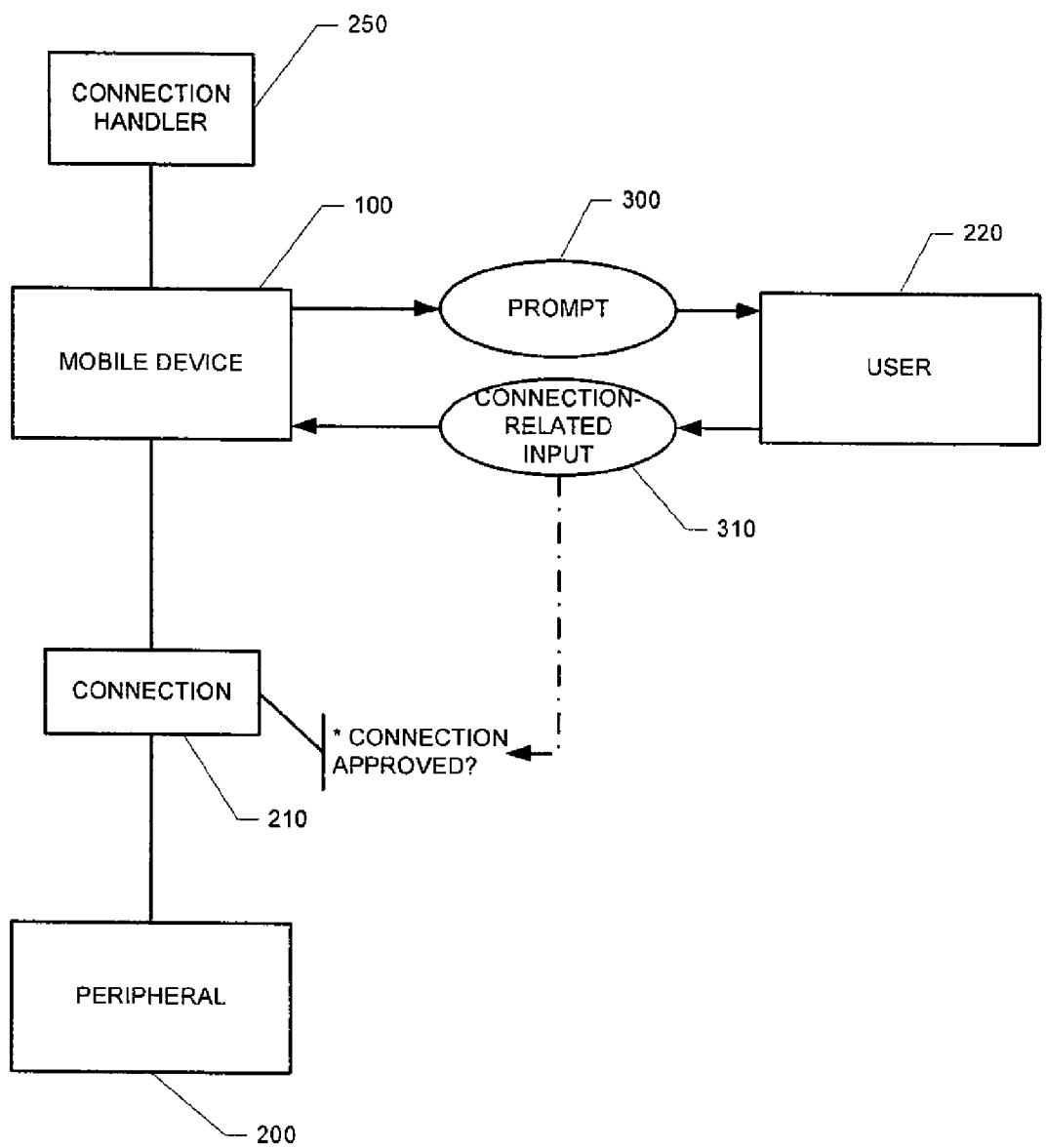

If a peripheral 200 cannot provide a prompt (as indicated at 230) and/or obtain input (as indicated at 232) from a user 220 in order to obtain connection approval, then the connection 210 can be established as shown in FIG. 4. With reference to FIG. 4, when a peripheral 200 is connected to the mobile device 100, the peripheral 200 is given the opportunity to supply connection-related input (e.g., a handheld password). If the peripheral 200 can supply the password, then the peripheral 200 is allowed to open a connection. However, if the peripheral 200 cannot supply the password (e.g., because it does not have a mechanism for the user to supply it), then the peripheral 200 can request that the connection approval process be redirected to the mobile device 100.

As shown at 300, the user 220 is then prompted on the mobile device 100 for their handheld password 310 in order to allow a connection 210 to be opened by the peripheral 200. If the user 220 knows the password 310 and supplies it to the mobile device 100, a connection 210 is opened with the peripheral 200, otherwise the connection 210 is refused. If the user does not have a handheld password 310 set on their mobile device 100, the user may just be notified that a connection approval is needed and asked to approve the opening of the connection 210 by the peripheral 200, without the user having to supply a password 310.

Figure 5:
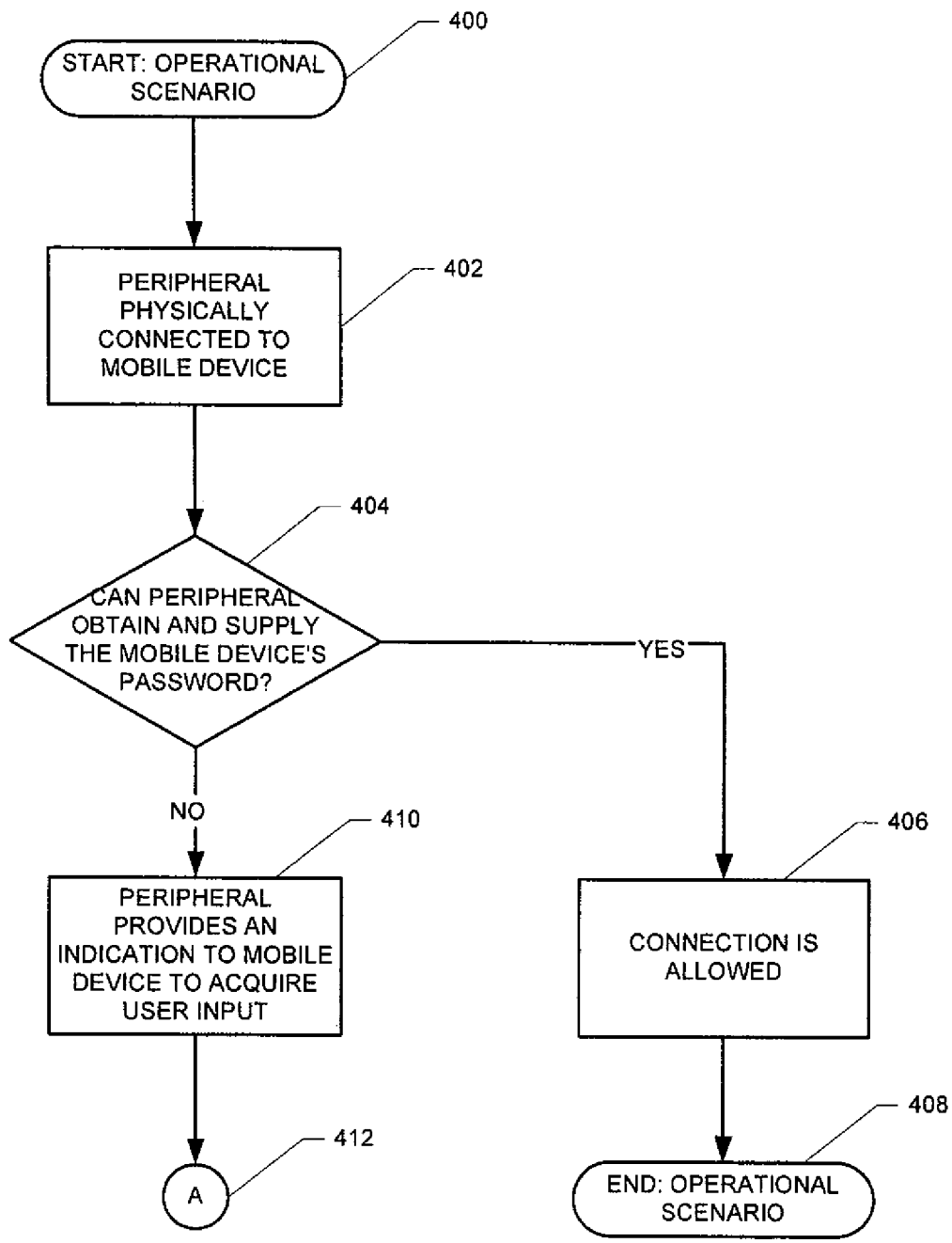
FIGS. 5 and 6 are flowcharts depicting an operational scenario for establishing a data connection between a peripheral and a mobile device.
Figure 6:
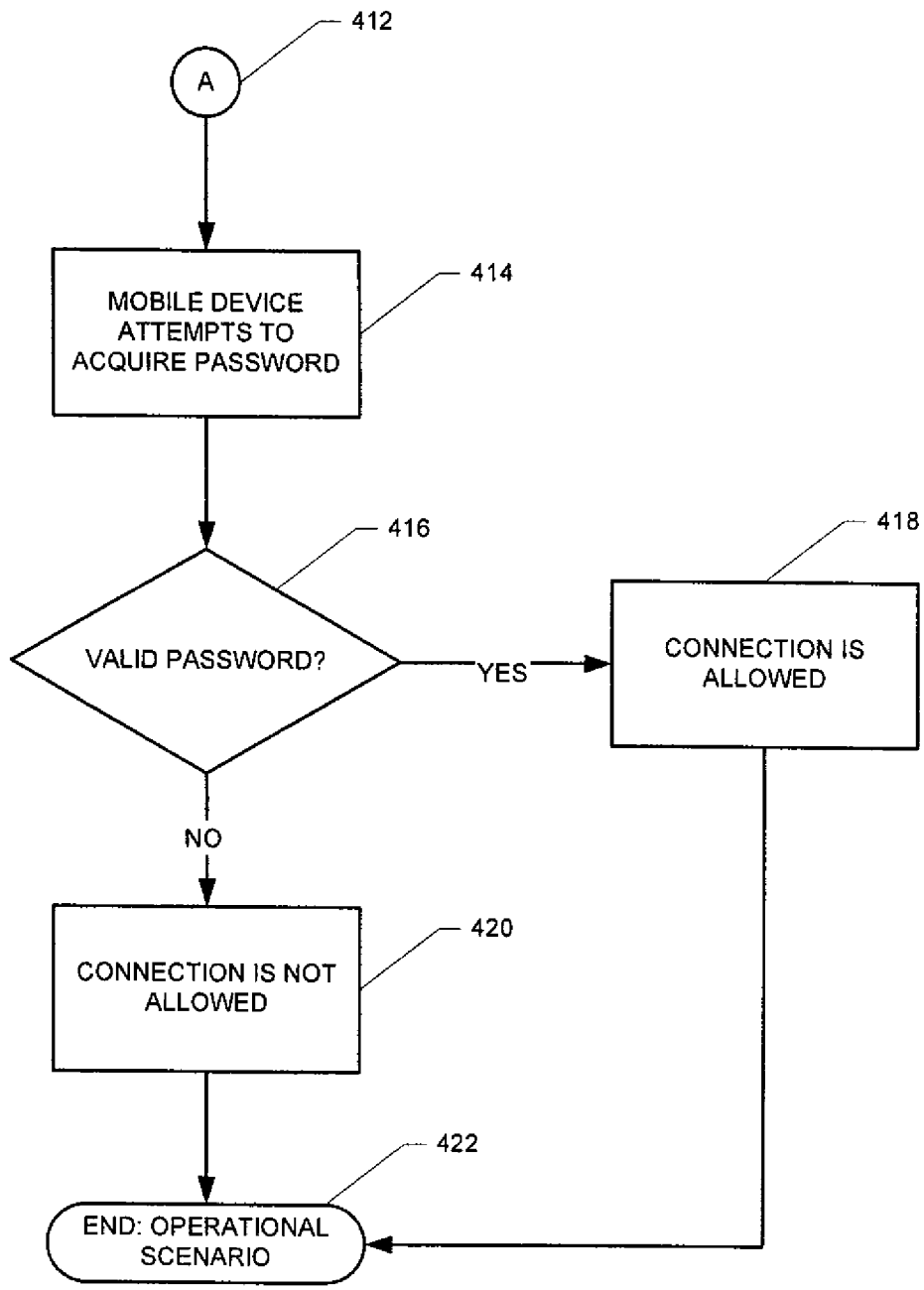

FIGS. 5 and 6 depict an operational scenario 400 for establishing a data connection between a peripheral and a mobile device. At step 402, a peripheral device is connected to a mobile device, such as through a USB cable or a wireless connection such as an infrared device or a Bluetooth connection, but the connection is not opened.

Decision step 404 examines whether the peripheral can obtain and supply the mobile device's password. If the peripheral can and the password is valid, then as indicated at step 406, the connection for transferring data is allowed, and processing for this operational scenario terminates at end block 408. However, if the peripheral cannot supply the mobile device's password (e.g., the password is invalid), then the peripheral provides at step 410 an indication to the mobile device to acquire the user input for allowing the data connection. Processing continues on FIG. 6 as indicated by continuation marker 412.

With reference to FIG. 6, the mobile device attempts to acquire the password from the user at step 414. The mobile device can acquire this information from the user by generating a message prompt on the mobile device's user interface. The message prompt could ask the user for the device's password. The message prompt may also contain an input field in which the user can type via the mobile device's keyboard a password entry.

If the user provides a valid password as determined at decision step 416, then the data transfer connection is allowed, and the device and peripheral can interact. Processing for this operational scenario terminates at end block 422.

If the user does not provide a valid password as determined at decision step 416, then the data transfer connection is not allowed, and processing for this operational scenario terminates at end block 422.

As illustrated by this operational scenario, the chance of a Trojan horse attack is reduced because the attacker also must know the handheld password. It also enhances a mobile device's support for peripherals, because it allows peripherals to be connected that on their own cannot supply the handheld password.

It should be understood that similar to the other processing flows described herein, the steps and the order of the steps in the flowchart described herein may be altered, modified and/or augmented and still achieve the desired outcome. For example, at step 414, when entering the password, the user could be restricted by the same policy setting as when the user would be entering the device's password independent of a peripheral data connection scenario. The memory contents of the mobile device can be wiped if their password is entered incorrectly a predetermined number of times. Also, the password they are typing may or may not be shown depending on password policy settings. As another example, many different types of approval indication inputs can be provided by the user in addition to or in place of a handheld's password.

Figure 7:
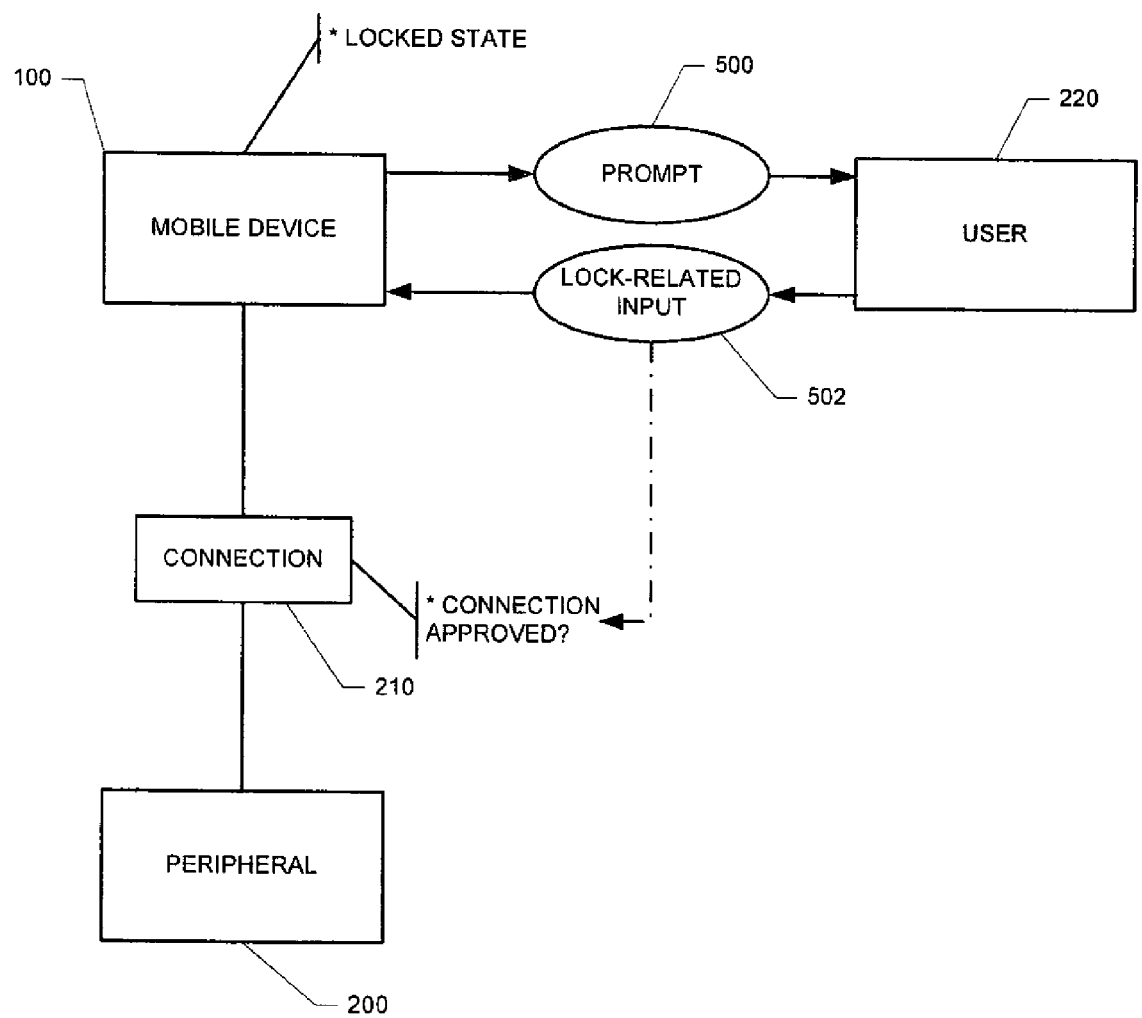
FIG. 7 is a block diagram depicting an operational scenario for establishing a data connection between a peripheral and a mobile device which is in a locked state.

FIG. 7 illustrates an operational scenario wherein the mobile device 100 is in a locked state. If the mobile device 100 is locked when the peripheral 200 is inserted into the device 100 or otherwise connected to the device 100, the user 220 may not be asked for their handheld password explicitly. This prevents the prompting 500 of the user 220 for their password 502 too often. When the user 220 unlocks their mobile device 100, they enter their handheld password, and through that act, they are implicitly allowing any currently connected peripheral 200 to open a connection 210. In this way, lock-related input 502 can be used for multiple purposes: (1) to unlock the mobile device 100; and (2) to approve the connection 210.

Figure 8:
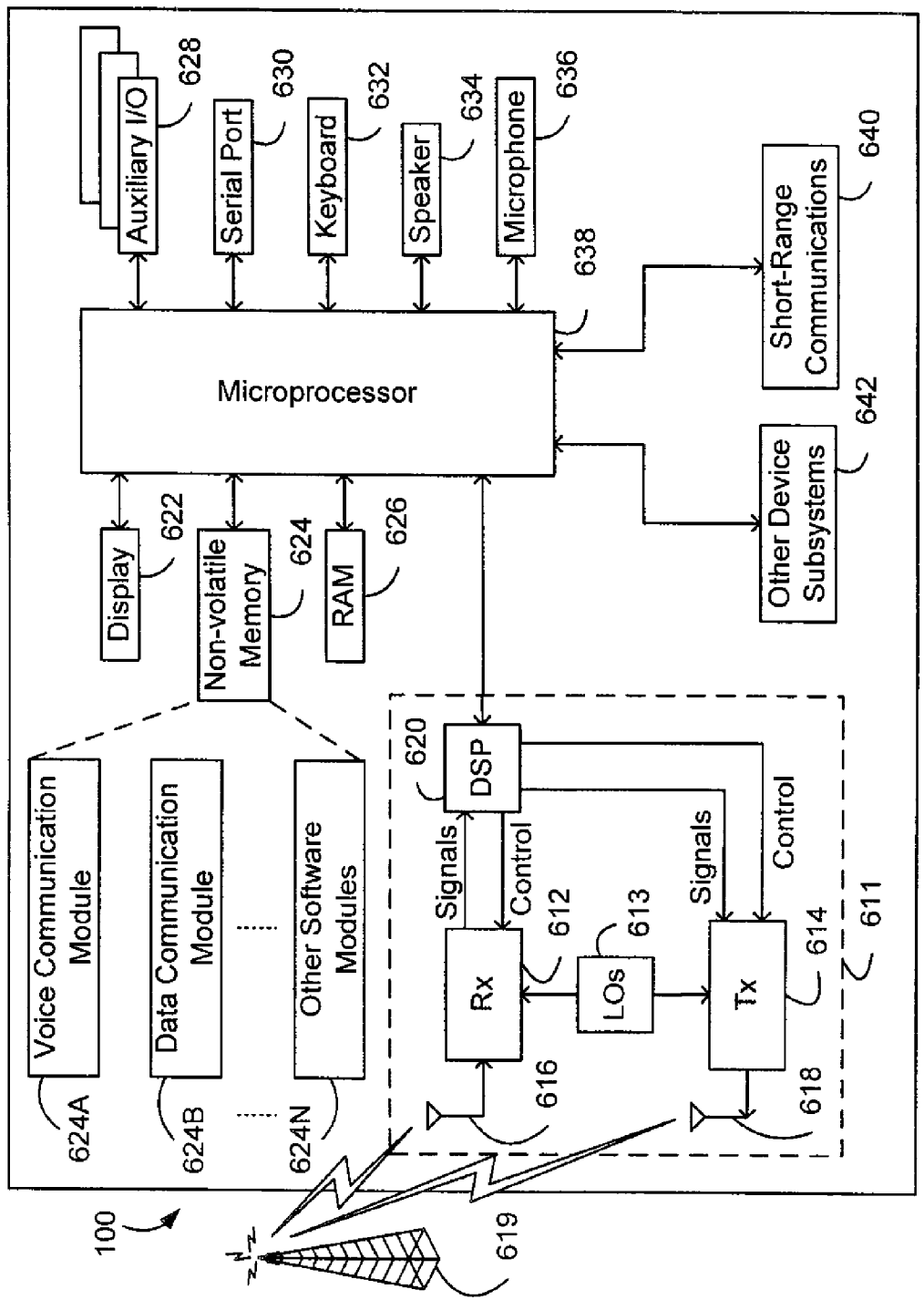
FIG. 8 is a block diagram of an example mobile device.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods disclosed herein may be used with many different computers and devices, such as a wireless mobile communications device shown in FIG. 8. With reference to FIG. 8, the mobile device 100 is a dual-mode mobile device and includes a transceiver 611, a microprocessor 638, a display 622, non-volatile memory 624, random access memory (RAM) 626, one or more auxiliary input/output (I/O) devices 628, a serial port 630, a keyboard 632, a speaker 634, a microphone 636, a short-range wireless communications sub-system 640, and other device sub-systems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 8 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 8 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

What is claimed is:

1. A method of establishing a data connection between a mobile device and a peripheral, comprising:
   receiving a request from the peripheral device that an approval process for the data connection be handled by the mobile device;
   providing through the mobile device an input mechanism to provide input for use in determining whether to approve the data connection between the mobile device and the peripheral; and
   determining whether to approve the data connection between the mobile device and the peripheral based upon the input.

2. The method of claim 1, wherein the data connection is to allow data to be transferred between the mobile device and the peripheral.

3. The method of claim 2, wherein the data connection includes a USB (universal serial bus) connection between the peripheral and the mobile device.

4. The method of claim 2, wherein the data connection includes a wireless connection between the peripheral and the mobile device.

5. The method of claim 1, wherein the peripheral is a personal computer.

6. The method of claim 1, wherein the peripheral is a smart card reader.

7. The method of claim 1, wherein the peripheral is a memory card.

8. The method of claim 1, wherein the peripheral is a hardware cryptographic-related token.

9. The method of claim 1, wherein the peripheral is a camera.

10. The method of claim 1 further comprising:
    providing through the mobile device a prompt to provide the input.

11. The method of claim 1, wherein the approval is required before data can be transferred between the mobile device and the peripheral.

12. The method of claim 1, wherein input instructions generate a user interface display asking for an input and configured to generate the region on the user interface in which the input can be provided.

13. The method of claim 1, wherein the input is a password for the mobile device.

14. The method of claim 1, wherein the data connection is opened based upon the determining whether to approve the data connection step.

15. The method of claim 1, wherein the mobile device is in a locked state at the time when a connection is established between the mobile device and the peripheral, wherein a password is provided as the input both for unlocking the locked mobile device and for use in the step of determining whether to approve the data connection.

16. The method of claim 1, wherein an approved data connection results in opening of the data connection, wherein the opening of the data connection allows application data to be transferred between the mobile device and the peripheral.

17. The method of claim 1, wherein the mobile device is a mobile wireless communications device.

18. A computer readable medium storing computer readable instructions that, when executed by a processor, implement a method comprising:
    receiving a request from the peripheral device that an approval process for the data connection be handled by the mobile device;
    providing through the mobile device an input mechanism to provide input for use in determining whether to approve the data connection between the mobile device and the peripheral; and
    determining whether to approve the data connection between the mobile device and the peripheral based upon the input.

19. An apparatus for establishing a data connection between a mobile device and a peripheral, comprising:
    a processing unit; and
    connection handler instructions processed by the processing unit to receive a request from the peripheral device that an approval process for the data connection be handled by the mobile device; output instructions processed by the processing unit to provide through the mobile device a prompt to provide input for use in determining whether to approve the data connection between the mobile device and the peripheral;

wherein the processing unit uses the connection handler instructions to determine whether to approve the data connection between the mobile device and the peripheral based upon the input.

* * * * *